United States Patent
Keifel et al.

[19]

[11] Patent Number: 5,918,912
[45] Date of Patent: Jul. 6, 1999

[54] ARRANGEMENT FOR MOUNTING A PIPE END FLANGE

[75] Inventors: Hans-Jörg Keifel, Schorndorf; Roland Clauss, Esslingen; Gerd Dürr, Gaggenau; Wolfgang Baudisch, Siebeldingen; Georg Reuther, Hochstadt; Franz Hieble, Senden, all of Germany

[73] Assignees: Daimler-Benz AG, Stuttgart; Heinrich Gillet & Co. KG, Edenkoben; Reinz-Dichtungs-GmbH, Neu-Ulm, all of Germany

[21] Appl. No.: 08/994,086

[22] Filed: Dec. 19, 1997

[30] Foreign Application Priority Data

Dec. 21, 1996 [DE] Germany .............. 196 53 908

[51] Int. Cl.⁶ ............................................ F16L 23/00
[52] U.S. Cl. ................ 285/124.1; 285/205; 285/360
[58] Field of Search ..................... 285/124.1, FOR 118, 285/205, 206, 376, 360

[56] References Cited

U.S. PATENT DOCUMENTS 3,177,649  4/1965  Tromel .
3,941,409  3/1976  Rameau .
5,180,005  1/1993  Marsais et al. ..................... 285/205
5,333,917  8/1994  Davey et al. ....................... 285/205
5,593,279  1/1997  Hayashi .............................. 285/205
5,636,515  6/1997  Matsumoto et al. .
5,806,897  9/1998  Nagai et al. ........................ 285/360
5,829,794  11/1998 Schulz-Hausmann et al. ...... 285/205

FOREIGN PATENT DOCUMENTS 27 42 296   4/1978   Germany .
42 05 454   8/1993   Germany .
43 38 719   5/1995   Germany .
44 30 339   2/1996   Germany .
62-023517   1/1987   Japan .

*Primary Examiner*—Eric K. Nicholson
*Attorney, Agent, or Firm*—Klaus J. Bach

[57] ABSTRACT

In an arrangement for mounting pipe end flanges to the exhaust gas passages of a cylinderhead of an internal combustion engine, the cylinderhead has pockets formed at one side of the exhaust gas passages and the pipe end flanges have projections projecting in opposite directions. One of the flange projections is received in the respective pocket while the opposite one is engaged by a guide strap holding the flange in engagement with the cylinderhead. A gasket and spring structure is disposed between the flange and the cylinderhead for controlling the engagement pressure between the flange and the cylinderhead.

14 Claims, 3 Drawing Sheets

ARRANGEMENT FOR MOUNTING A PIPE END FLANGE

BACKGROUND OF THE INVENTION

The invention relates to an arrangement for mounting a pipe end flange to the cylinderhead of an internal combustion engine having a cavity in which part of the flange is received and clamping means disposed at the side of the flange opposite the cavity for holding the flange in firm engagement with the cylinderhead.

DE 42 05 454 A1 discloses a similar arrangement for mounting the flange of a pipe elbow to a cylinderhead. The flange is part of the pipe elbow and is to be connected to an outwardly open gas passage of the cylinderhead of an internal combustion engine. For the mounting of the flange, the cylinderhead is provided, in the area of the gas passage, with a pocket into which a part of the flange is inserted for clamping the flange to the cylinderhead. Opposite the pocket, the cylinderhead includes a mounting screw by which the side of the flange opposite the pocket can be forced into engagement with the cylinderhead.

For general technical background information, reference is made to the following printed publications: DE 44 30 339 A1, and DE 27 42 296 A1.

It is, however, a disadvantage of the arrangements shown in prior art publications that for example in exhaust manifolds of exhaust systems, which are subjected during operation of the internal combustion engine to high temperatures, high tensions develop because of thermal expansions. As a result of such high tensions, the thermally, highly stressed exhaust manifold is subjected to deformations whereby it may prematurely fail. Another disadvantage of such arrangements is that the freedom of design is severely limited because the flange clamping screws need to be accessible.

It is the object of the present invention to provide a pipe mounting arrangement for the connection of a pipe elbow to the cylinderhead of an internal combustion engine which is highly reliable, but still provides for substantial freedom for designing the arrangement and, in which, at the same time, the stresses to which the pipe elbow is subjected during operation of the internal combustion engine are substantially reduced.

SUMMARY OF THE INVENTION

In an arrangement for mounting pipe end flanges to the exhaust gas passages of a cylinderhead of an internal combustion engine, the cylinderhead has pockets formed at one side of the exhaust gas passages and the pipe end flanges have projections projecting in opposite directions. One of the flange projections is received in the respective pocket while the opposite one is engaged by a guide strap holding the flange in engagement with the cylinderhead. A gasket and spring structure is disposed between the flange and the cylinderhead for controlling the engagement pressure between the flange and the cylinderhead.

A particular advantage of the arrangement according to the invention is that special mounting of the flange permits a relative movement between the flange and the cylinderhead in the engagement area of the flange so that thermal expansions during heating and contractions during cooling of the manifold can be accommodated. With a relatively large longitudinal expansion of the manifold or pipe elbow, a corresponding length adjustment of the pipe elbow is provided for by the relative movement, whereby an undesirable thermal deformation of the pipe elbow or manifold is avoided.

Furthermore, with the arrangement according to the invention, gas conducting components can also extend over the flanges since no access to screws is needed. As a result, the gas conducting components can have larger flow cross-sections. With pipe elbows, it is further possible to provide for different radii of curvature, whereby the pipes can be laid out to provide favorable flow paths. Particularly for manifolds, the increased design variability, a simple shell geometry and a simplified arrangement of the dividing planes for the shells can be realized.

Preferably, the guide strip forms together with the cylinderhead a pocket for receiving a flange projection and the flange mounting bolts are disposed at a distance from the engagement surfaces of the flange with the cylinderhead. This provides for easy accessibility of the bolts, whereby mounting of the manifold is greatly facilitated.

The arrangement is particularly advantageous for multi-cylinder engines where the cylinders are arranged in a line and an integral manifold with several individual pipe elbows and flanges is used, which all have projections received in respective pockets formed in a single mounting strip. With the use of a single mounting strip, a substantial reduction of mounting components can be achieved.

If the strip mounting bolts are disposed in an area between the gas passages of adjacent cylinders at a distance from the flanges, the mounting is further facilitated by the particular location of the mounting bolts.

In a particularly advantageous embodiment, a multilayer metal gasket, which includes elastically deformable pleats is disposed between the flange and the cylinderhead surfaces. Such a gasket insures the sealing functions, while, at the same time, the sealing pressure is adjustable by the number and the sizes of the pleats. Also, such a gasket fulfills spring functions, that is, it can act as a spring structure. Under normal operating conditions, the flange is held in engagement with the cylinderhead by the friction generated by the pretension force of this spring. With increased longitudinal expansion forces, the friction generated by the friction forces can be overcome and relative movement between the flange and the cylinderhead can take place, whereby the longitudinal expansion forces are substantially reduced.

Preferably, in a mounted state, the transverse play between the flange projections and the receiving pockets and the transverse play between the flange projections and the pockets of the guide strip is 0.1–0.5 mm and the relative movement between the flanges and the cylinderhead occurs in the longitudinal direction of the engine. There is only little relative movement at the engagement surface of the flange in a direction of the engine. As a result, an undesirable tilting of the pipe elbow in the longitudinal guide structures formed by the pockets is prevented.

Further features and advantages will become apparent from the following description of the invention on the basis of the accompanying drawings.

BRIEF DESCRIPTIONS OF THE DRAWINGS

FIG. 1 shows schematically a part of a cylinderhead of an internal combustion engine with an arrangement according to the invention, that is, with pipe elbows mounted on the cylinderhead wherein however only the flanges of the pipe elbows are shown and each flange has projections which are received in respective pockets formed on the cylinderhead at one side and pockets formed by a guide strip removably mounted at the opposite side.

DESCRIPTION OF A PREFERRED EMBODIMENT

Figure 1:
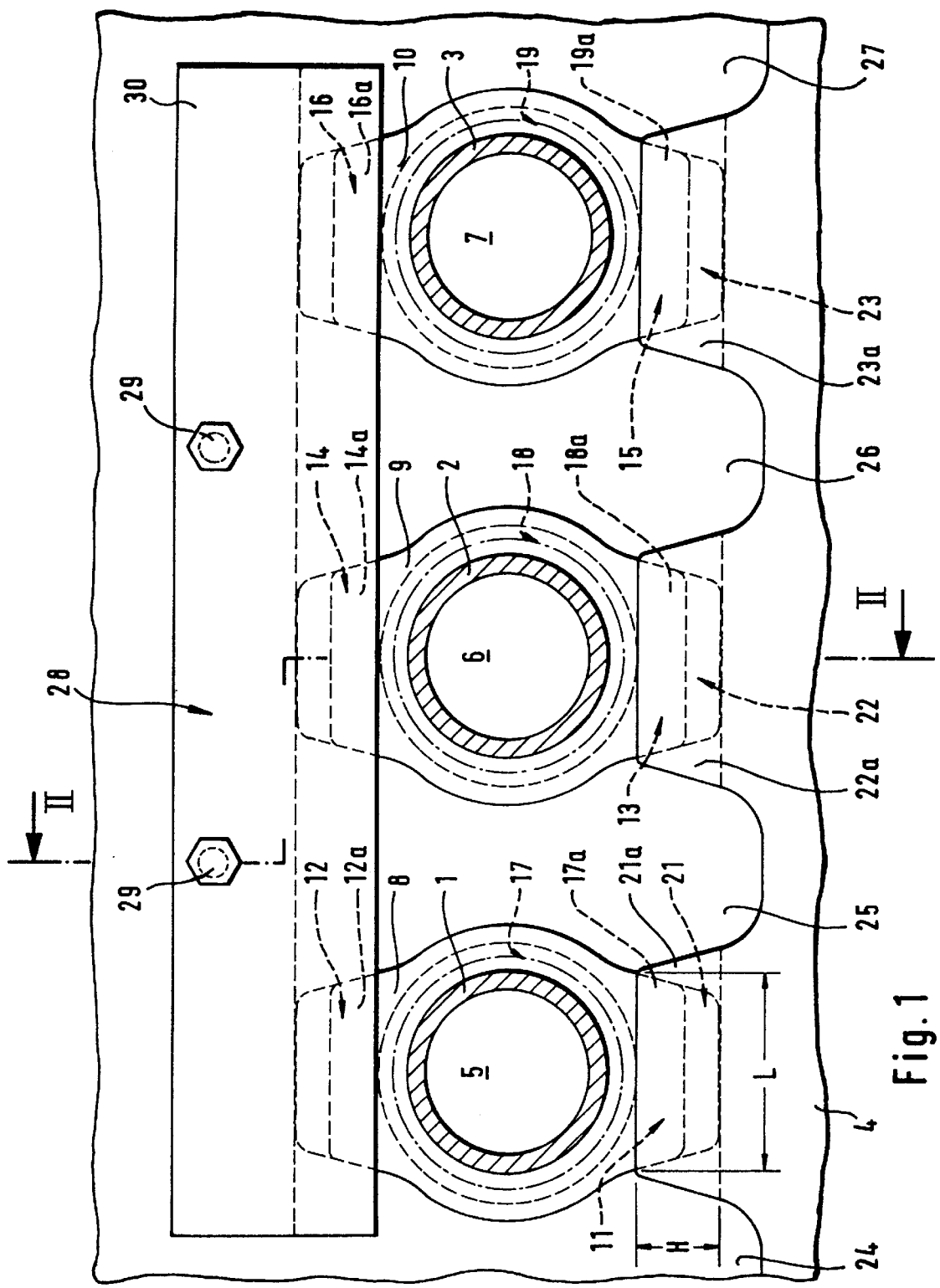
Figure 2:
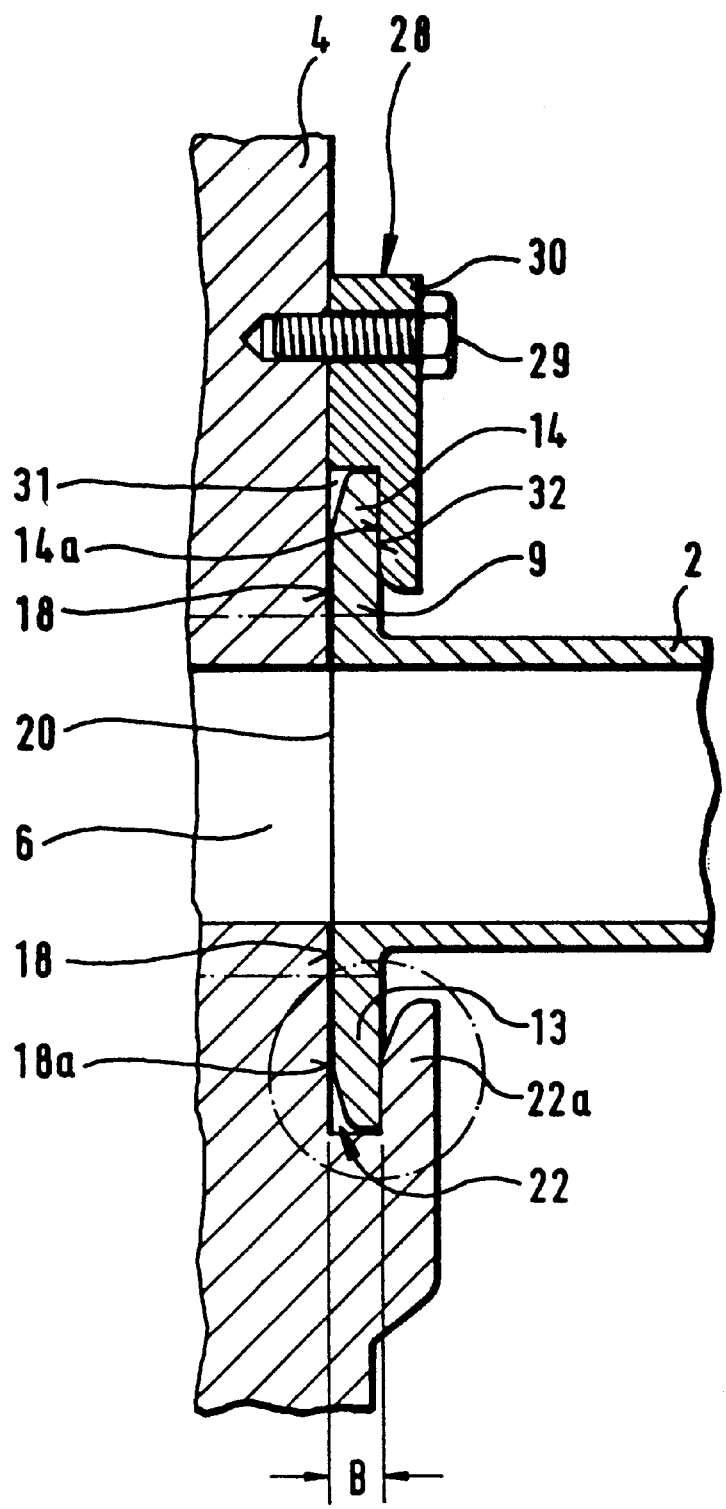
FIG. 2 is a cross-sectional view taken along line II—II of FIG. 1.

FIGS. 1 and 2 show an arrangement for mounting several pipe elbows 1–3 of an exhaust manifold, which is not shown, on the cylinderhead of an internal combustion engine.

The cylinderhead 4 comprises several outwardly open gas passages 5–7 (exhaust gas passages) to which the pipe elbows 1–3 are connected. The pipe elbows 1–3 which are shown in FIGS. 1 and 2 in cross-section are provided at their ends adjacent the cylinderhead 4 with flanges 8–10 each of which has, with respect to the gas passage, oppositely disposed projections arranged in a direction normal to the longitudinal direction of the engine.

In the vicinity of the exit openings of the gas passages 5–7, the cylinderhead 4 has flat engagement surface areas 17–19 on which the flanges 8–10 and the respective gaskets 20 (see FIG. 2) are disposed. The flanges 8–10 are sealingly joined to the cylinderhead by means of the gaskets 20 as will be described in greater detail below.

Below the respective gas passages 5–7, the cylinderhead 4 includes, integrally formed therewith, upwardly open groove-like pockets 21–23 for receiving the flange projections 11, 13, and 15. The lower parts 17a–19a of the respective engagement surface areas 17–19 are covered by webs 21a–23a of the respective pockets 21–23. The width B of the pockets 21–23 is adjusted to the thickness of the flange projections 11, 13, 15 in such a way that, with the flange projections 11, 13, 15 inserted into the pockets and the pipe elbows mounted, the sides of the flange projections 11, 13, 15 remote from the respective cylinderhead surface areas are engaged by the webs 21a–23a of the pockets 21–23 such that clamping forces are generated by the webs 21a–23a which are effective on the lower parts 17a–19a of the engagement surfaces 17–19 disposed opposite the webs 21a–23a.

As shown in FIG. 1, the pockets 21–23 have about the length L and the height H of the flange projections 11, 13, 15. The recesses 24–27 shown disposed in the longitudinal direction between the pockets 21–23 are provided only for weight reduction.

Opposite the pockets 21–23, clamping means 28 are provided for engaging the flange projections 12, 14, 16. The clamping means 28 comprises a clamping strap 20 which extends in the longitudinal direction of the cylinderhead 4 and which is removably mounted thereto by bolts 29. By way of the clamping strap 30, the flanges 8, 9, and 10 can be pressed with their engagement surfaces 12a, 14a and 16a into firm engagement with the cylinderhead 4. The clamping strap 30 has the shape of a claw provided with an engagement surface 32 (FIG. 2) and includes mounting means (bolts 29) which are spaced from the engagement surfaces 32 in a longitudinal direction of the cylinderhead. When installed, the clamping strap 30 forms together with the cylinderhead 4 a downwardly open groove (pockets 31) in which the flange projections 12, 14, 16 are received.

The flanges 8–10 and the gaskets 20 are clamped onto the cylinderhead 4 by pressing the engagement surface 32 of the clamping strap 30 onto the surfaces 12a, 14a, 15a of the flange projections 12, 14, 16 by means of the bolts 29.

The removable mounting means (bolts 29) for mounting the clamping strap 30 to the cylinderhead 4 are disposed essentially between the gas passage 5–7 of adjacent cylinders and outside the flanges 8–10 as shown in FIG. 1.

The number of mounting means (bolts 29) can be smaller than the number of pipe elbows of the manifold.

The clamping strap for an exhaust manifold of a five cylinder internal combustion engine which has a manifold with five pipe elbows may be mounted onto the cylinderhead for example by only three or four bolts.

Figure 3:
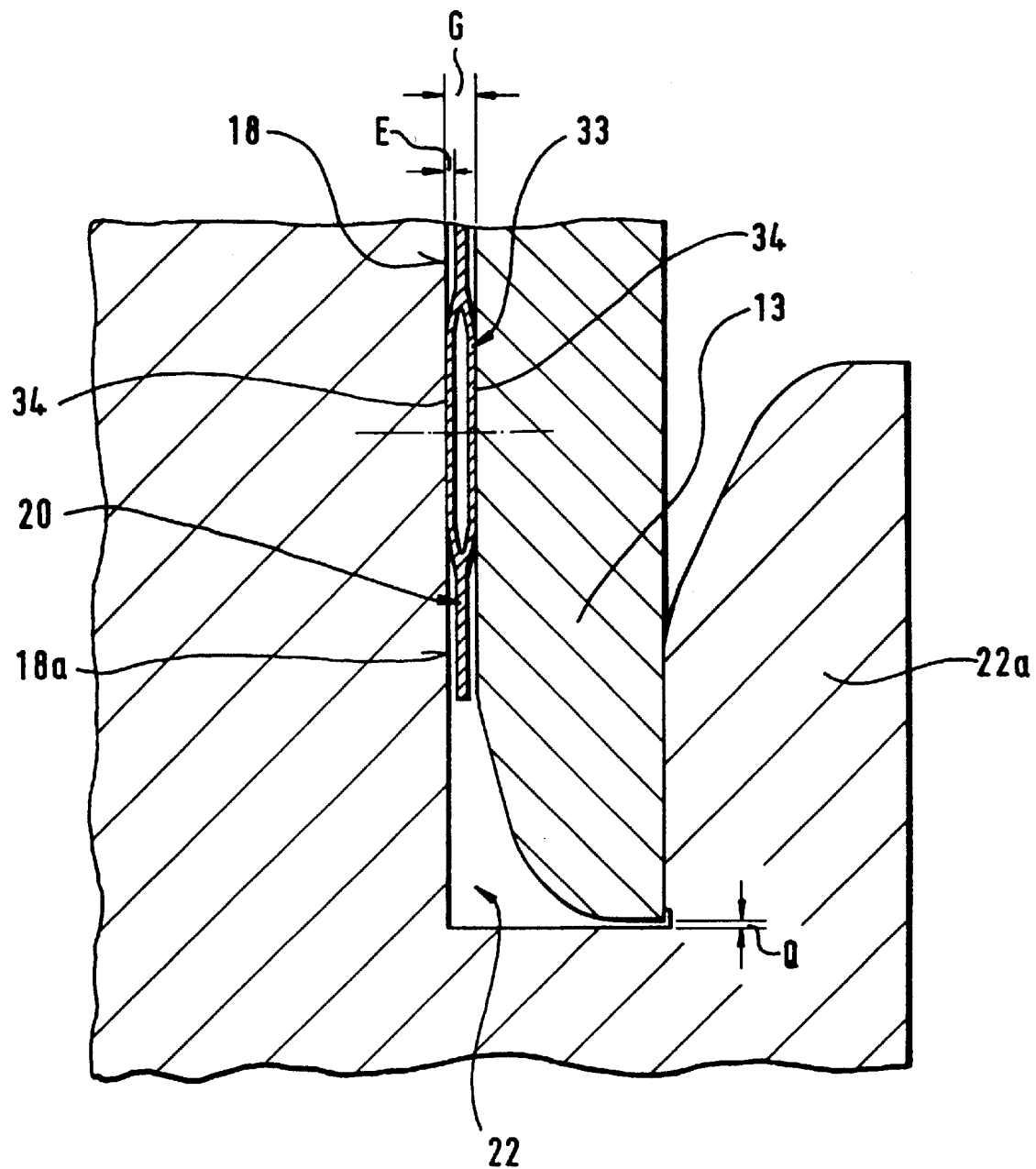
FIG. 3 is an enlarged view of the area encircled in FIG. 2, wherein the metal sheet seal structure, which is provided with resilient pleats, is shown.

In a mounted state, a relative movement between the flanges 5–7 and the cylinderhead 4 at the respective engagement areas 17–19 of the flanges 5–7 is possible. Preferably, as shown in FIG. 3, there is between each flange 5–7 and the cylinderhead 4 a spring 33 by which the engagement pressure of the respective flanges 5–7 can be controlled. In FIG. 1, FIG. 2 and FIG. 3, the same components are designated by the same numerals.

In a preferred embodiment of the invention, the spring structure 33 is an integral part of the gasket 20. In this case, the gasket 20 is a single or multi-layer metal sheet gasket which includes several elastically deformable pleats 34 (see FIG. 3). The engagement pressure of the gasket can be controlled by the number and/or dimensions of the pleats 34. For example, numerical values for the height E of a single pleat 24 are between E=0.2 to 0.7 mm with a total thickness of the gasket 20 of 0.1 to 3 mm. In FIG. 3, the height E of a pleat is 0.3 mm and the total thickness G of the gasket is G=1.2 mm.

In order to avoid the undesirable tipping movement of the pipe elbows, the compensation movements of the pipe elbows should be mainly in the longitudinal direction of the cylinderhead.

In another embodiment of the invention, there may be, instead of the integral seal and spring structure, a separate serial arrangement of the gasket with a spring structure. Furthermore, in another embodiment of the invention, the gasket and/or the spring structure may be attached to the flanges 5–7 or formed integrally therewith before the pipe elbows are mounted.

In order to provide for predetermined friction values between the flanges and the cylinderhead, the guide strap, the flange and/or the gasket may be coated with a material having a certain friction coefficient. Also, the gasket may be provided with a surface coating providing for a seal surface.

It is pointed out that the pockets 21–23 do not need to be formed integrally with the cylinderhead, but can be formed by components which are removably attached to the cylinderhead like the guide strap 30 engaging the flange projections 12, 14 16.

What is claimed is:

1. An arrangement for mounting pipe end flanges to outwardly open gas passages of a cylinderhead of an internal combustion engine, said cylinderhead having, adjacent one side of said gas passages, pockets and said pipe end flanges having flange portions received in said pockets and a clamping strap extending across said flanges essentially at the opposite side of said pockets, clamping means attaching said clamping strap to said cylinderhead for forcing said flanges into engagement with cylinderhead gaskets disposed between said flanges and said cylinderhead for sealing said flanges with said cylinderhead and a spring structure arranged between said flanges and said cylinderhead for controlling the engagement pressure of said flanges so as to permit a relative movement between said flanges and said cylinderhead.

2. An arrangement according to claim 1, wherein each of said flanges includes first and second projections disposed opposite one another with respect to the gas passage covered by a flange, said first projection being received in a cylinderhead pocket and said second flange projection having a surface for engagement by said guide strap.

3. An arrangement according to claim 2, wherein said clamping strap, when mounted to the cylinderhead, forms with the cylinderhead a clamping strap pocket for receiving said second flange projection, said flange being engageable with said cylinderhead by said clamping strap via the engagement surfaces of said second flange projection, said clamping means disposed at a location spaced from said engagement surface.

4. An arrangement according to claim 2, for a multi-cylinder internal combustion engine having cylinders arranged in a line and including an integral exhaust manifold with several pipe elbows, each provided with a flange having said first and second flange projections, said first flange projections being received in pockets formed on said cylinderhead and said second flange projection being engaged by a single guide strap extending over all the second flange projections of the pipe elbows of the cylinders arranged in a line arrangement.

5. An arrangement according to claim 3, wherein said clamping means for mounting said clamping strap to said cylinderhead are arranged essentially between said gas passages at a distance from said flanges.

6. An arrangement according to claim 5, wherein the number of clamping means is smaller than the number of pipe end flanges.

7. An arrangement according to claim 1, wherein said spring structure is an integral part of said gasket.

8. An arrangement according to claim 7, wherein said gasket comprises at least one metal layer which is provided with elastically deformable pleats, the engagement pressure of the metal sheet gasket being adjustable by the number, the arrangement and the dimensions of the pleats.

9. An arrangement according to claim 1, wherein said gasket is a flat gasket and said spring structure is disposed on said flat gasket.

10. An arrangement according to claim 2, wherein, with said flanges mounted on said cylinderhead, there is a transverse clearance between the first flange projection and the pocket receiving the first flange projection and between the second flange projection and the pocket formed by said guide strap of 0.1–0.5 mm, any relative movement between the flange and the cylinderhead occurring mainly in the longitudinal direction of the cylinderhead.

11. An arrangement according to claim 1, wherein said gasket and said spring structure are attached to the flange before said flange is mounted on said cylinderhead.

12. An arrangement according to claim 1, wherein said guide strap and said flange and said gasket are provided with a coating to provide predetermined friction values.

13. An arrangement according to claim 1, wherein said gasket is provided with a surface coating for forming a seal surface.

14. An arrangement according to claim 2, wherein said first flange receiving pockets are formed by components which are removably attached to the cylinderhead.

* * * * *